Nov. 23, 1965 I. L. DELIN 3,219,290

TAPE TRANSPORT MECHANISM

Original Filed Sept. 26, 1962

INVENTOR
IRWIN L. DELIN,

BY
Brumbaugh, Free, Graves & Donohue
ATTORNEYS

United States Patent Office 3,219,290

Patented Nov. 23, 1965

3,219,290
TAPE TRANSPORT MECHANISM

Irwin L. Delin, Fairfield, Conn., assignor to Columbia Broadcasting System, Inc., New York, N.Y., a corporation of New York Original application Sept. 26, 1962, Ser. No. 226,234. Divided and this application Aug. 14, 1963, Ser. No. 302,213

3 Claims. (Cl. 242—55.12)

This is a division of a copending application Serial No. 226,234, filed on September 26, 1962, for "Recording-Reproducing Apparatus."

This invention relates to recording-reproducing apparatus, and, more particularly, to a tape transport mechanism for driving a recording tape in apparatus of this type.

In the past, tape recording and reproducing machines typically have been bulky and of a relatively large size, thereby not portable and limited in use almost exclusively to the office or home. With the advent of solid-state electronics, characterized by electrical components of relatively small size, tape recording and reproducing machines have been considerably reduced in size, rendering them fairly portable and capable of being hand-carried from one place to another. The changes in electronic components, however, have not been sufficient by themselves to render the entire tape recording and reproducing machine small enough that it may be carried conveniently in the pocket of a user, for example, to render the apparatus truly portable and susceptible of use anywhere.

The present invention is directed to a compact tape cartridge for a pocket-size tape recording and reproducing machine, and includes a tape transport mechanism formed from a supply hub and a take-up hub mounted for rotation and carrying a recording tape thereon which is adapted to be transferred from one hub to the other past a recording-reproducing transducer. The two hubs are coupled together by a slipping spring clutch arrangement so that when the tape is withdrawn from one hub, the other hub is rotated at a speed sufficient to maintain a predetermined tape tension.

Figure 2:
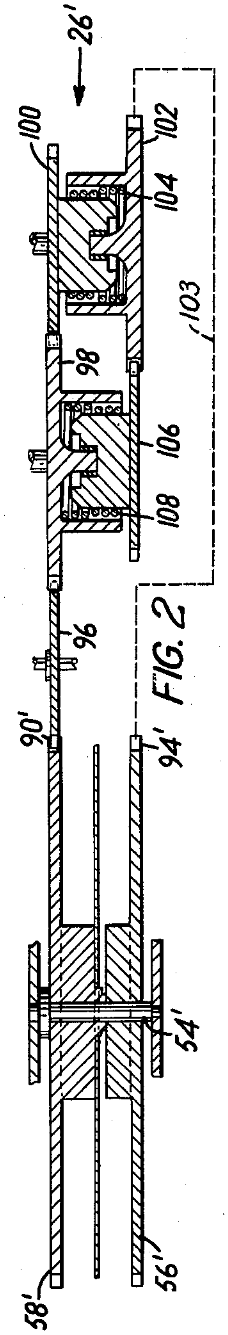
Figure 1:
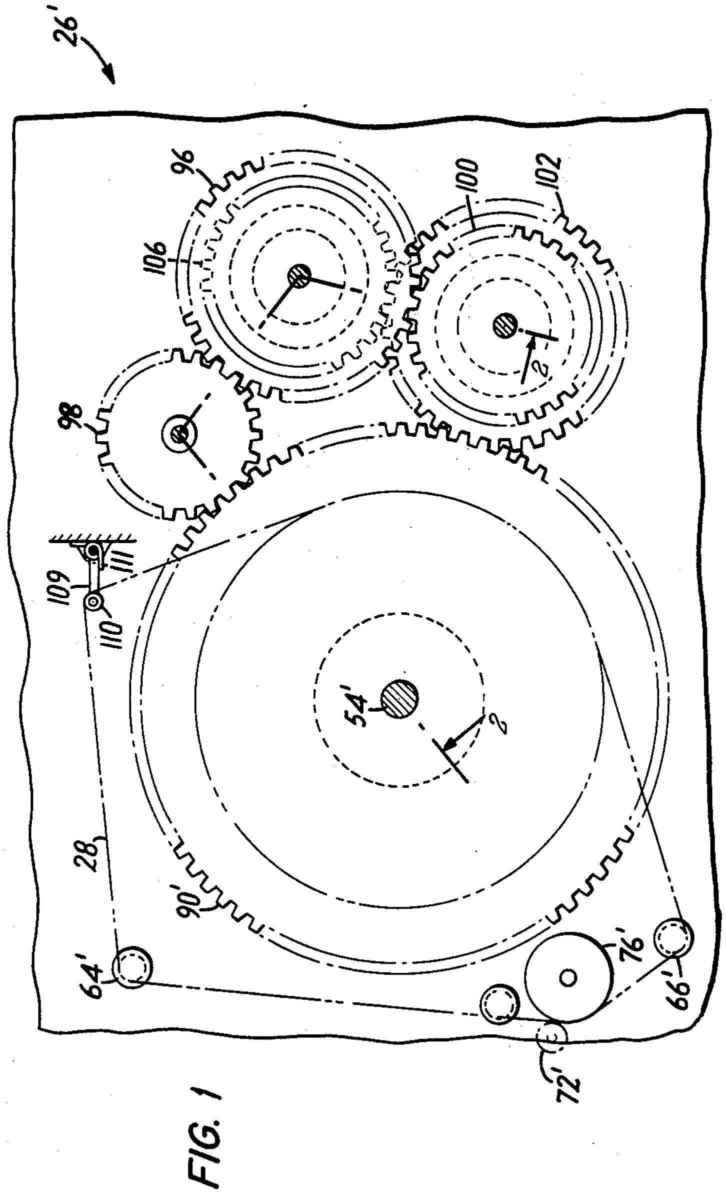

The invention is described in detail in the following description, which is to be read in conjunction with the appended drawing in which:

FIG. 1 is an enlarged plan view of a tape transport mechanism in accordance with the invention; and FIG. 2 is a layout view in section of the tape transport mechanism shown in FIG. 1, taken generally along the section line 2—2 of that figure and looking in the directions of the arrows.

Referring to FIGS. 1 and 2, a first hub 56' and a second hub 58' are each independently mounted for rotation about a shaft 54'. The hubs 56' and 58' are of equal diameter and either may serve as the supply hub. An idler gear 96 meshes with gear teeth 90' formed on the periphery of the hub 58'. The idler 96 in turn meshes with gear 98 that is coupled to a gear 100. The gears 96, 98, 100 constitute a first gear train in contact with the first hub 58' and in driving and driven relation thereto. The gear 100 is *w* gear positions removed from the hub 58', *w* in this case being three, an odd number. The gear 100 is coupled to another gear 102 by a first slipping spring one-way clutch means 104. The gear 102 meshes with gear teeth 94' formed on the periphery of the hub 56', as represented schematically by the dotted line 103, and is thus *x* gear positions removed from the hub 56', *x* in the case being one, like *w* an odd number. The gear 102 meshes also with a gear 106 that is coupled to the gear 98 through a second slipping spring one-way clutch means 108. The gears 102 and 106 constitute a second gear train in contact with the second hub 56' and in driving and driven relation thereto. The gear 98 is *y* gear positions removed from the hub 58', *y* in this case being two, an even number. Similarly, the gear 106 is *z* gear positions removed from the hub 56', *z* in this case being two, an even number.

As shown in FIG. 1, a recording tape 28 is guided by guides 64' and 66' as it is transferred from one of the hubs 56' and 58' to the other by the action of pressure roller 76' and capstan 72' which pinch the tape 28 therebetween to drive the tape. Typically, the capstan 72' is driven by a motor (not shown), and a recording-reproducing transducer (not shown) is positioned adjacent the capstan 72' to record and reproduce signals on the tape 28.

In the following description of the operation of the tape transport mechanism 26', it is assumed that the hub 58' is the supply hub, that the hub 56' is the take-up hub, and that the supply hub 58' is rotated clockwise (as viewed in FIG. 1) when the tape 28 is removed therefrom. As the hub 58' is rotated clockwise, the idler gear 96 is driven counter-clockwise, which in turn drives the gear 98 clockwise. Clockwise rotation of gear 98 results in counter-clockwise rotation of gear 102 through the action of the first slipping spring clutch 104. For this direction of rotation, the clutch 104 is designed to couple together the gears 100 and 102 with a slippage only at a relatively high torque. The gear 102, rotating counter-clockwise and meshing with gear teeth 94' on the hub 56', drives that hub in a clockwise direction, thereby to wind the tape 28 thereon as it is removed from the hub 58'.

Since the diameter of gear 102 is larger than that of the gear 100, hub 56' would normally be driven faster than the hub 58', which would lead to a breakage of the tape 28. However, the relatively high torque slippage in the coupling between the gears 100 and 102 provided by the slipping spring clutch 104 prevents any breakage and produces a predetermined tape tension as the tape is unwound from the hub 58' and transferred to the hub 56'.

When the tape 28 is withdrawn from the hub 56' and transferred to the hub 58', thereby rotating the hub 56' in a counter-clockwise direction as viewed in FIG. 1, the gear 102 is driven clockwise. With this movement of the gear 102, the slipping spring clutch 104 slips at a relatively low torque and effectively provides no coupling between the gears 102 and 100. The gear 102, however, meshes with the gear 106 and drives this gear counter-clockwise. For this movement of the gear 106, the slipping spring clutch 108 couples the gear 106 to the gear 98 with a slippage only at a relatively high torque, thereby to rotate the gear 98 counter-clockwise. Counter-clockwise rotation of the gear 98 produces a clockwise rotation of the idler gear 96 and therefore a counter-clockwise rotation of the hub 58' to wind the tape 28 thereon as it is removed from the hub 56'.

Since the diameter of gear 98 is larger than that of gear 106, the hub 58' would normally be driven faster than the hub 56', which would result in breakage of the tape 28. However, the relatively high torque slippage in the coupling between the gears 106 and 98 provided by the slipping spring clutch 108 prevents any breakage and maintains a predetermined tape tension as the tape is taken up by the hub 58' from the hub 56'.

It should be noted that the slipping spring clutch 108 effectively decouples the gears 98 and 106 when the tape 28 is transferred from the hub 58' to the hub 56' and the slipping spring clutch 104 provides the driving power to the hub 56'.

To minimize the effects of vibrations produced by the meshing of the gear teeth in the arrangement shown in FIGS. 1 and 2 on the motion of the tape 28, a low mass, highly compliant member 109 (FIG. 1) is utilized. The member 109, which includes a revolving guide 110 around which the tape 28 passes, is loaded by a spring 111 against one side of the tape. Gear teeth impulses, which may cause the tape tension to vary appreciably, are transmitted to the member 109 and the spring 111 and are absorbed therein to maintain the tape tension relatively constant.

It is apparent that the tape transport mechanism described above is subject to modification which may depart from the exact form of the structure shown in the drawing. The invention, therefore, should be taken to be defined by the following claims.

I claim:

1. A tape transport mechanism comprising a supply hub and a take-up hub mounted for rotation about a common axis and adapted to receive a recording tape thereon, a first slipping spring clutch mechanism coupling together the supply and take-up hubs and rotating the take-up hub in a tape-take-up direction upon rotation of the supply hub in a tape-paying-off direction to transfer the recording tape from the supply hub to the take-up hub, and a second slipping spring clutch mechanism coupling together the take-up and supply hubs and rotating the supply hub in a tape-take-up direction opposite the tape-paying-off direction upon rotation of the take-up hub in the tape-paying-off direction to transfer the recording tape from the take-up hub to the supply hub, the slipping clutch mechanisms being exterior to the hubs.

2. A tape transport mechanism comprising a first hub and a second hub mounted for rotation about a common axis and adapted to receive a recording tape thereon, a first circular idler contacting the first hub in driving and driven relationship thereto, a first circular member contacting the circular idler in driving and driven relationship thereto, a second circular member driven by the first circular member, a third circular member driven by the second circular member when the second circular member is rotated in a first direction, the third circular member contacting the second hub in driving and driven relationship thereto thereby to drive that hub when driven by the second circular member, and a fourth circular member contacting the third circular member and driven thereby and driving the first circular member when the third circular member is driven by the second hub in a second direction opposite from the first direction.

3. A tape transport mechanism comprising first and second hubs, the first hub being adapted to be rotated in a first direction for paying off tape wound thereon and in a second direction for winding tape thereon and the second hub being adapted to be rotated in a third direction for paying off tape wound thereon and in a fourth direction for winding tape thereon, first gear-train means in contact with the first hub and in driving and driven relation thereto, second gear-train means in contact with the second hub and in driving and driven relation thereto, first one-way clutch means connecting a first gear of the first gear-train means to a second gear of the second gear-train means, and second one-way clutch means connecting a third gear of the first gear-train means to a fourth gear of the second gear-train means, the first gear being *w* gear positions removed from the first hub, the second gear being *x* gear positions removed from the second hub, the third gear being *y* gear positions removed from the first hub, and the fourth gear being *z* gear positions removed from the second hub, *w* and *x* being a first class of integers and *y* and *z* being a second class of integers and one of the first and second classes of integers being limited to odd integers and the other of the first and second classes of integers being limited to even integers, the first clutch means being operative upon rotation of the first hub in the first direction to establish a driving-driven relation between the first and second gear-train means, respectively, the second clutch means free-wheeling, whereby the second hub is driven by the second gear-train means in the fourth direction, and the second clutch means being operative upon rotation of the second hub in the third direction to establish a driving-driven relation between the second and first gear-train means, respectively, the first clutch means free-wheeling, whereby the first hub is driven in the second direction.

References Cited by the Examiner

UNITED STATES PATENTS

| | | | |
|---|---|---|---|
| 2,958,477 | 11/1960 | James et al. | 242—55.12 |
| 2,971,715 | 2/1961 | Mitchell | 242—55.13 |
| 3,084,880 | 4/1963 | Grant et al. | 242—55.13 |

MERVIN STEIN, *Primary Examiner.*